Dec. 7, 1965 P. A. M. MURRAY 3,221,415
METHOD FOR CROP DRYING
Filed June 4, 1962 4 Sheets-Sheet 1
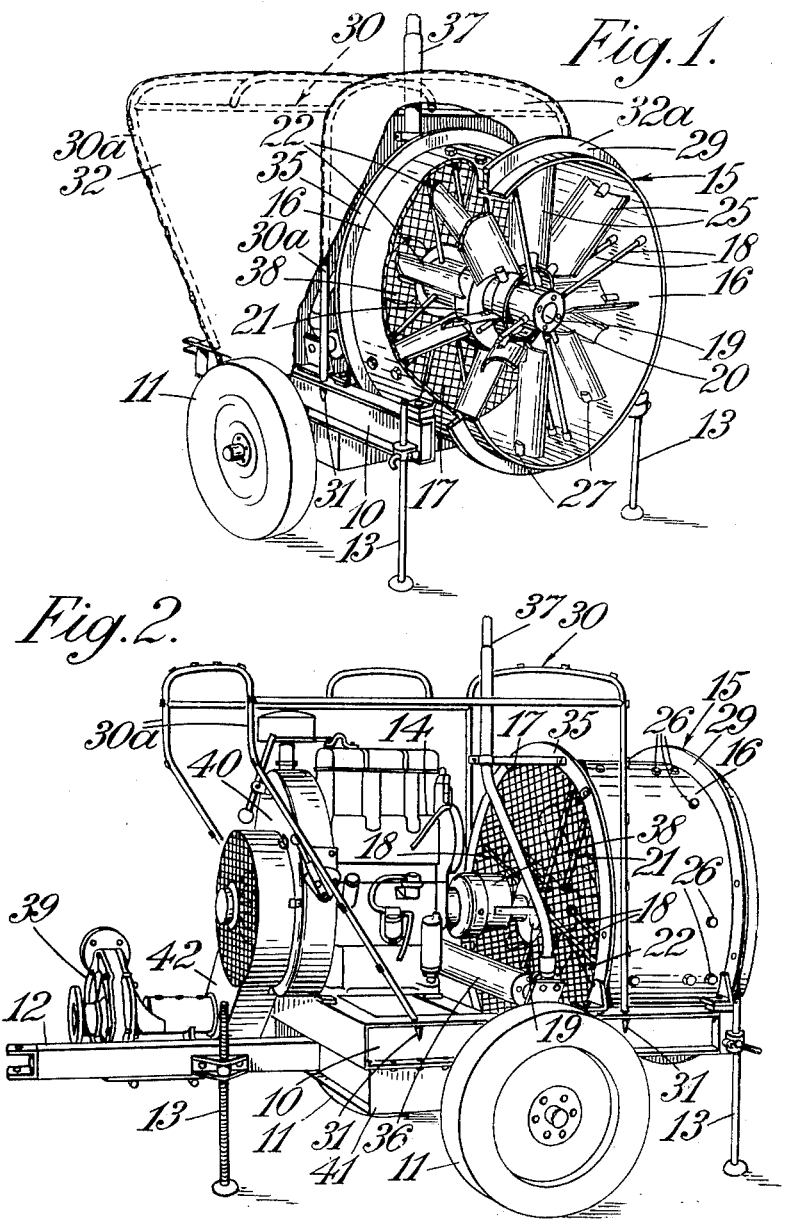
Inventor
Patrick Anthony Molteno Murray
his Attorneys

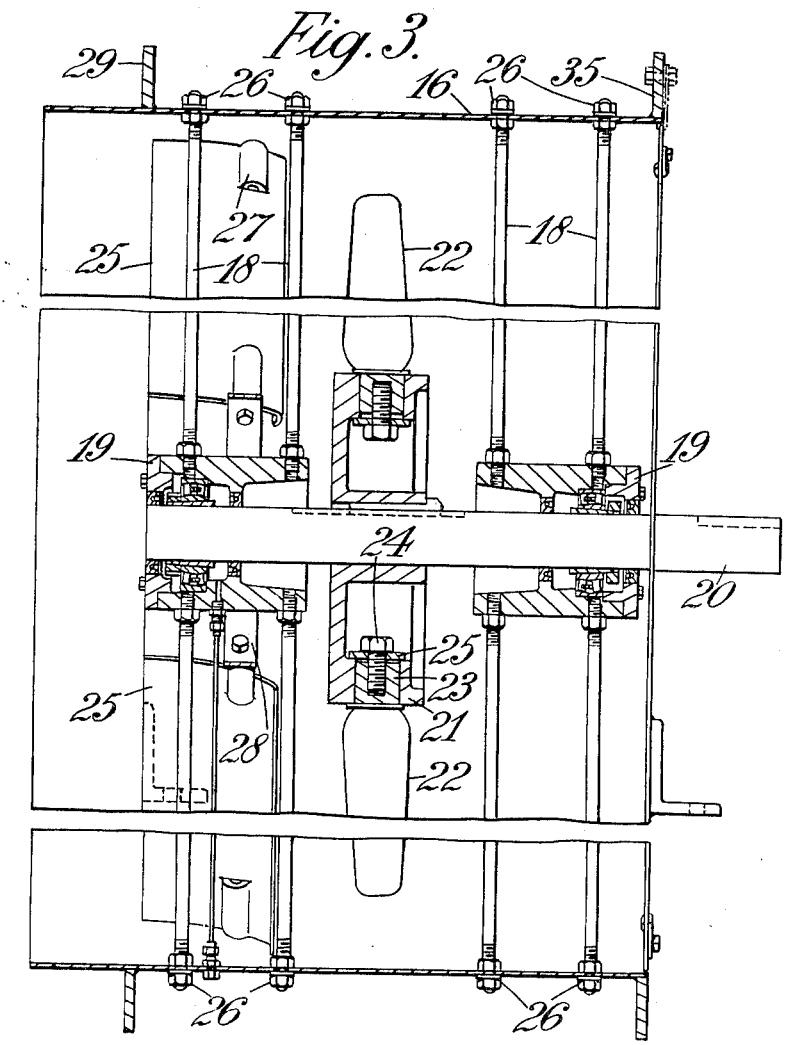

Dec. 7, 1965  P. A. M. MURRAY  3,221,415
METHOD FOR CROP DRYING
Filed June 4, 1962  4 Sheets-Sheet 4

INVENTOR
Patrick Anthony Molteno Murray

United States Patent Office 3,221,415
Patented Dec. 7, 1965

3,221,415
METHOD FOR CROP DRYING
Patrick Anthony Molteno Murray, Painswick, England, assignor to R. A. Lister & Company Limited, Dursley, England, a British company
Filed June 4, 1962, Ser. No. 205,478
3 Claims. (Cl. 34—30)

This is a continuation-in-part of application Serial No. 29,376, filed May 16, 1960, now abandoned.

This invention relates to a new and improved method for drying crops.

Heretofore two principal methods of crop drying have been used, ventilation and high temperature drying. Each has its shortcomings.

In the ventilation method, the crop is dried in its place of storage using specially designed duct systems to distribute air through the crop, and fans, usually electric, of low horsepower and thus low operative pressure to produce a low rate of air flow through the crop at ambient temperatures.

The limitations of this method are, among others, first, that the low rate of air flow and low operative pressure available from the fan demands that the crop shall first be low enough in moisture content that the pressure resistance of the crop is kept down within the capabilities of the fan to produce flow through the crop. Otherwise a prolonged drying period will result and this produces serious crop deterioration. Second, the electric fans generally used do not produce enough heat to raise the temperature of the air being blown and it would rarely amount to more than one degree Fahrenheit. Thus during weather periods of high relative humidity little if any drying can be accomplished and again serious crop deterioration can take place. Third, the use with this system of auxiliary heating equipment to overcome high relative humidity problems is expensive and often dangerous. Fourth, the crop depth is very limited, i.e., the crop must be disposed in relatively shallow depths because of the low operating pressure. For if the crop depth is not kept relatively shallow, the air cannot be forced through the crop sufficiently to do its job. Another result often is that the fans employed in this system will stall because of the crop resistance. Fifth, the duct-work is costly and the use of comparatively shallow depths over larger surface areas is wasteful of space so that the system generally is comparatively uneconomical in terms of tons per hour of crop dried.

The other principal method, high temperature drying, requires the heating of the air being blown to very high temperatures on the order of 35 to 65 degrees Fahrenheit above ambient temperature. In this way high drying rates can be achieved with low horsepower fans delivering limited volumes of air, but expensive and sometimes dangerous auxiliary heating is usually necessary. This system can only be satisfactorily carried out in shallow depths in batches with repeated loadings. This method requires careful control to eliminate the risk of overdrying and consequent loss of nutritive value of hay and germination of grain. If shallow depths are exceeded overdrying of the lower layers and consequent condensation of the upper layers results in deterioration and uneven drying. This method is usually associated with high cost drying.

My invention obviates the limitations and drawbacks of the aforementioned systems heretofore employed.

I provide a method of drying crops such as hay and grain comprising blowing massive quantities of air through a conduit into the storage facility housing the crop to be dried, said air being blown into said storage facility at temperatures only 4 to 15 degrees Fahrenheit above ambient temperature and with a force sufficient to overcome high static pressures.

Preferably I provide for blowing air at the rate of at least 40 ft. per minute in medium density baled hay for instance stored at depths of up to 20 ft. or at the rate of at least 25 ft. per minute in grain such as wheat or corn of a depth of 15 ft. for instance; at forces capable of overcoming pressures of 0–7" water gauge caused by crop resistance; at temperatures elevated from 4° F. to 15° F. above ambient temperature. In order to obtain these conditions of flow with 80 tons of hay in storage, the weight being that of the dried hay, about 30,000 cubic feet of air are required per minute and with 150 tons of grain stored 15 feet deep about 12,000 cubic feet of air are required per minute. These requirements can be met by an air supply apparatus as hereinafter described.

It is understandable from the foregoing that in my method crops may be properly dried without damage in layer depths up to three times greater than heretofore accomplished with consequent savings in space, time and undamaged product. By providing massive quantities of air at elevated temperatures low enough not to cook or overdry and thereby damage lower layers of crop yet high enough to overcome high relative humidities and do the job, I enable far greater crop depth to be used which results in significantly increased production and more economic storage. Further, by providing said massive quantities of air at forces heretofore not utilized, crops can be properly dried without damage in layer depths and at moisture content levels never before believed possible.

Formerly, it has been necessary to have a different fan and matching prime mover for each different drying requirement. With my invention, a single unit can be used to dry a wide range of crops stored or arranged for drying in a variety of ways.

To practice my new method, I have devised a blower which enables one to utilize otherwise standard equipment without the necessity of auxiliary heating equipment.

I provide a blower in combination with an internal combustion engine mounted on a transportable chassis with hood structure adapted to direct inflowing air over said engine comprising an axial flow fan directly connected to said engine and having non-stalling characteristics and adapted to absorb substantially the full continuously available power of said engine and having a cowling disposed therearound with straightener blade means disposed therein on the output side of said fan whereby the air being blown is straightened to travel in substantially straight lines.

Other details, objects and advantages of the invention will become apparent as the following description of a present preferred embodiment and a present preferred method of practicing the same proceeds.

In the accompanying drawings I have shown a present preferred embodiment and have illustrated a present preferred method of practicing the same in which FIGURES 1 and 2 are perspective views of the apparatus with parts broken away;

FIGURE 3 is a sectional elevation of the fan;

Figure 4:
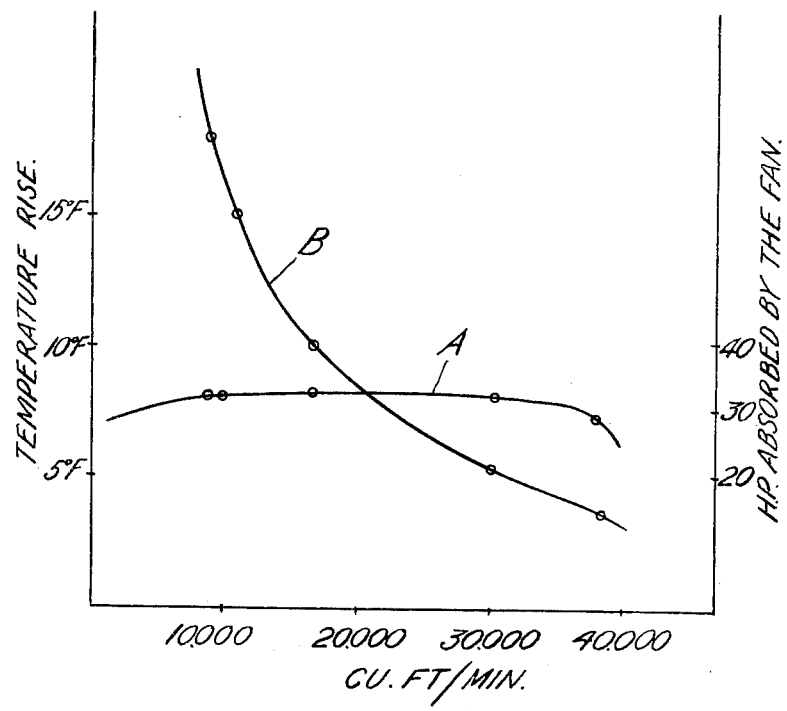
FIGURES 4 and 5 are performance graphs of a typical form of the apparatus.

Referring to FIGURES 1 and 2, the apparatus comprises a chassis frame 10 mounted on wheels 11 and also having a tow bar 12 or the like. The chassis is also provided with retractable steadies 13 which can be lowered into contact with the ground when the apparatus is in use.

An internal combustion engine 14 is mounted on the frame 10 at the tow bar end with the engine shaft axis extending longitudinally of the frame 10. A blower assembly 15 is also mounted on the frame 10 with the fan shaft in line with the engine shaft.

The blower assembly comprises a tubular casing 16 with a wire grid 17 at the engine end and a series of pairs of rods 18 (FIGURES 1 and 3) supporting bearings 19 for the fan shaft 20 to which is keyed a hub member 21 for the fan rotor blades 22. Each blade 22 has a boss 23 at its root end, the boss extending into a radial bore in the hub member 21 and being clamped to the hub member by a set screw 24 and washer 25a. A series of curved-section outlet guide blades 25 are interposed between the rods 17 at the outlet end of the casing 16, the blades being secured at their outer ends to the casing 16 by set screws 26 passing through the casing 16 and engaging bosses 27 and being joined together at their inner ends by being bolted to a ring 28 encircling the adjacent bearing 19. The outlet end of the casing 16 is provided with an external flange 29 so as to form with the adjacent part of the housing a spigot for engaging air delivery ducting.

The fan is designed to absorb the full power developed by the engine 14, and the fan and engine shafts are directly connected through a coupling or clutch 38.

The casing 16 forms one part of a cowling structure for enclosing the fan and engine, and another part of the cowling structure is formed by a removable hood structure shrouding the engine 14. The hood structure comprises a framework 30 having peg portions 31 at the lower ends of its main inverted U-shaped members 30a to fit in holes in the frame 10 and a canvas or like covering 32. The covering 32 is retained in position by clips 33 and has an end piece 32a which fits around the casing 16 behind a flange 35 on it. The underside of the engine is enclosed by means of a drip tray 41 or other suitable member mounted on the frame 10.

The engine 14 has an exhaust system including a silencer 36 which is positioned between the engine and the fan and extends across the frame 10 in a direction transverse to the axis of the engine and fan shafts and so presents a larger area to air flowing to the fan and also a final exhaust pipe 37 which extends upwards through the covering 32. The silencer 36 presents a large heat transfer area to the air flow.

The engine shown is air cooled and has a cooling air fan housed in its flywheel cover 40.

In use, for example for drying crops, the detachable framework 30 and the covering 32 are placed in position and when the engine is running a large volume of air is drawn through the ducting arrangement to flow first over the engine and its exhaust system, thereby to absorb a very large proportion of the heat generated by the engine, and then through the fan where work is done on it causing a further increase in its temperature. The speed at which the engine is run may be varied, and is selected so that the volume of air, its temperature rise and its pressure are matched to the job to be performed. For some purposes it may be desirable to blank off part of the fan inlet and for other purposes the apparatus may be operated with the hood structure removed.

I have found that an internal combustion engine such as a diesel engine will heat the air being blown to the extent of 78% to 85% of the fuel being used. The performance can theoretically be calculated from:

$$Q = \frac{E}{100} \times \frac{C \times \text{B.H.P.} \times \text{C.V.}}{S \times dt}$$

where:

$Q$ = Volume of air delivered by unit in cubic feet/minute.
$C$ = Specific fuel consumption of engine in pints/B.H.P./hr.
B.H.P. = Brake horsepower of engine.
C.V. = Net heat content of 1 Imperial pint in B.t.u.
$S$ = Specific heat of air (1.08).
$dt$ = Air temperature rise above ambient through unit.
$E$ = Thermal efficiency of the unit (78% to 85%).

Thus a 22 horsepower engine can give 24,800 cubic feet of air at 5 degrees temperature F. above ambient or 8,130 cu. ft. at 15 degrees F. above ambient. A 33 horsepower engine can give 37,200 cubic feet of air at 5 degrees temperature F. above ambient or 12,200 cu. ft. at 15 degrees F. above ambient. A 44 horsepower engine can give 49,500 cubic feet of air at 5 degrees F. above ambient or 16,200 at 15 degrees F. above ambient.

From the above equation it can be seen that it is desirable to use a fan such as described which will absorb substantially the full continuously available horsepower of the engine over the range of delivery volumes quoted, and be able to deliver these volumes against the pressures and at the rates of air flow required in my method of crop drying.

In the example described herein an engine which develops 33 horsepower in conjunction with an axial flow fan of 42" diameter can be utilized admirably well for delivering the requirement of my improved method. The engine has a direct driving connection to the fan and a single heat exchanger afforded by the exhaust system of the engine.

The fan is designed so that whatever pressure it is called upon to deliver against, it will demand from the engine the full continuously available power, thus the maximum amount of heat is always available and recovered in the highest volume of air against the pressure met in varying crop resistances.

The axial-flow fan is designed to have non-stalling characteristics, the blade angle or pitch being set with a low effective angle of incidence (or angle of attack) to the resultant direction of the air flow relative to the blade at all sections. The tip clearance of the blade is preferably as small as is practicable. To achieve delivery of large volumes of air at the pressures required a runner of high aerodynamic solidity is desirable containing blades of high efficiency aerofoil section. Further, to ensure recovery of pressure losses a system of straightener vanes is incorporated. The fan runner may for instance have 10 blades of high efficiency aerofoil section, the chord of each blade tapering from 7⅜" to 5¾" at the tip, and the blades being set so that their angle of incidence to the air is less than 16° and preferably about 15½°.

The blower has 8 straightening stator vanes at its outlets, which vanes have a chord of 8", have their chords set at 70° to the rotor axis and have their concave and convex surfaces parallel. The stator vanes are 15" in length and extend inwardly from the casing 16. This increases the pressure from the blower by converting the rotational energy of the air into forward straight line flow.

The above described combination delivers massive volumes of air from 12,000 to 39,000 cu. ft./min. at temperatures ranging from 4 to 15 degrees Fahrenheit above ambient temperature and at forces sufficient to overcome static pressures of up to 7 inches W.G.

Under test over the full range of delivery pressures from the fan and with an engine as described above running at full power, the fan absorbed substantially the full available power of the engine, as indicated by trace A in FIGURE 4, for the wide range of air delivery rates and low delivery temperatures indicated by the trace B.

Figure 5:
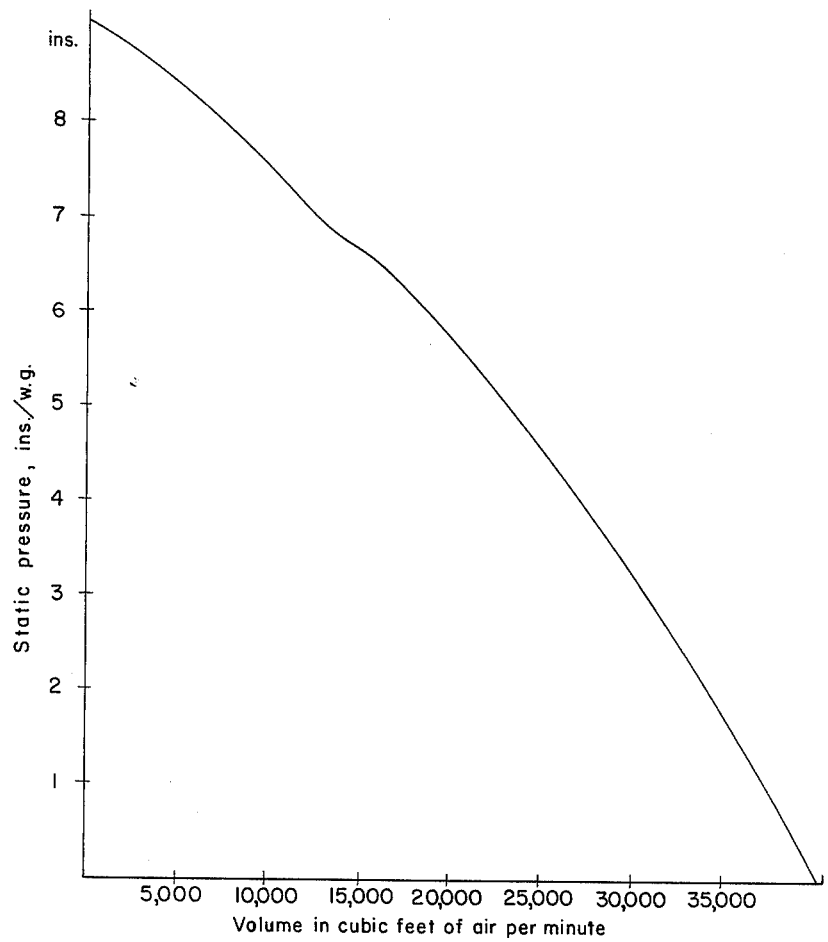

In practice, operating static pressures of from 0 to over 6" are encountered in a wide range of crop drying conditions and are well within the performance of the blower as is apparent from FIGURE 5. Previous single stage axial flow fans have not been capable of operating against such high pressures.

FIGURE 5 shows that this combination delivers massive volumes of air at forces sufficient to overcome static pressure resistances up to 7 inches W.G. at 12,000 cu. ft./min. air delivery.

Thus it is clear that by combining an axial flow fan of non-stalling characteristics as above described with an internal combustion engine so that the fan is at all times utilizing the full continuously available power, I have devised an apparatus which will perform in accordance with my new improved method for drying crops.

Figure 6:
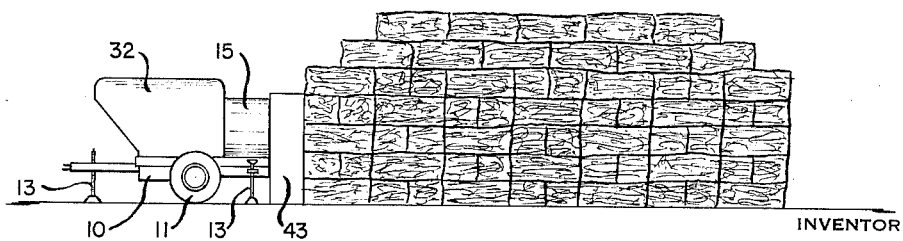
FIGURE 6 is a side elevation of a hay tunnel being dried by my apparatus in accordance with my new improved method.

My improved method enables such crops as hay to be dried loose, baled or chopped in simple tunnel stacks in the field (as shown in FIGURE 6) or on simple ventilation floors in a barn without recourse to special ducts to insure even distribution. This eliminates the necessity for elaborate and costly conversions necessary in the prior art. FIGURE 6 shows my apparatus blowing into a tunneled hay stack through a simple conduit 43 at the entrance of the tunnel.

The engine is air cooled and incorporates a fan driving air through cooling passages in the engine and the air employed for cooling was delivered into the cowling to flow through the main fan 15.

These volumes and temperature rises are especially suitable for bulk low-temperature conditioning or drying of crops where overdrying is to be avoided, and are also suitable for other drying operations.

The apparatus is also shown as incorporating a pump 39 which may be driven from the engine 14 by any suitable form of disconnectible drive accommodated in casing 42.

The earlier described massive volume of air delivered at forces sufficient to overcome the aforementioned high static pressures means that great amounts of air can be pushed through crop depths heretofore thought unattainable. The described temperature rise over ambient temperatures is sufficient to overcome high relative humidity conditions and still is low enough to eliminate wasteful and deleterious overdrying. The volume, force and temperature also combine to overcome crop moisture contents previously not thought possible, with the result that drying time per ton of crop, and apparatus and storage investment, have been significantly reduced, in addition to which is it accomplished safely and without the ill effects to the crops heretofore experienced.

While I have shown and described a present preferred embodiment of the invention and have illustrated and described a preferred method of practicing the same, it is to be distinctly understood that the invention is not limited thereto but may be otherwise variously embodied and practiced within the scope of the following claims.

I claim:
1. A method for drying stem crops including grain and hay comprising
   (a) stacking the crop for drying into a stack of a single heavy thickness of about 15 to 20 feet thus presenting static pressure resistance to air blown into the stack of up to 7 inches water gauge,
   (b) blowing massive quantities of air on the order of 12,000 to 39,000 cubic feet per minute into and throughout the stack at a velocity rate of at least 25 to 40 feet per minute,
   (c) elevating the temperature of the air being blown from 4 to 15 degrees Fahrenheit above ambient temperature; and
   (d) blowing the air at a force sufficient to overcome pressure resistance in the stack of up to 7 inches water gauge.

2. The method claimed in claim 1 wherein the crop being dried is baled hay stacked in a single thickness of about 20 feet and the quantity of air blown is on the order of 30,000 cubic feet per minute.

3. The method claimed in claim 1 wherein the crop being dried is grain stacked in a single heavy thickness of about 15 feet deep and the quantity of air blown is on the order of 12,000 cubic feet per minute.

References Cited by the Examiner
UNITED STATES PATENTS

| | | | |
|---|---|---|---|
| 1,781,473 | 11/1930 | Owen | 34—30 |
| 2,036,127 | 3/1936 | Edholm | 98—55 |
| 2,562,405 | 7/1951 | Altman. | |
| 2,653,754 | 9/1953 | McDonald | 230—114 |
| 2,706,506 | 4/1955 | Hait | 230—114 |
| 2,840,300 | 6/1958 | Carr | 230—235 |
| 2,849,174 | 8/1958 | Spreng | 230—116 |
| 2,972,208 | 2/1961 | Martin | 47—2 |
| 3,086,533 | 4/1963 | Touton | 34—30 |

WILLIAM F. O'DEA, *Acting Primary Examiner.*

JAMES W. WESTHAVER, NORMAN YUDKOFF,
*Examiners.*